May 25, 1937. L. S. HAMER 2,081,431
VALVE SEAT
Filed March 10, 1934
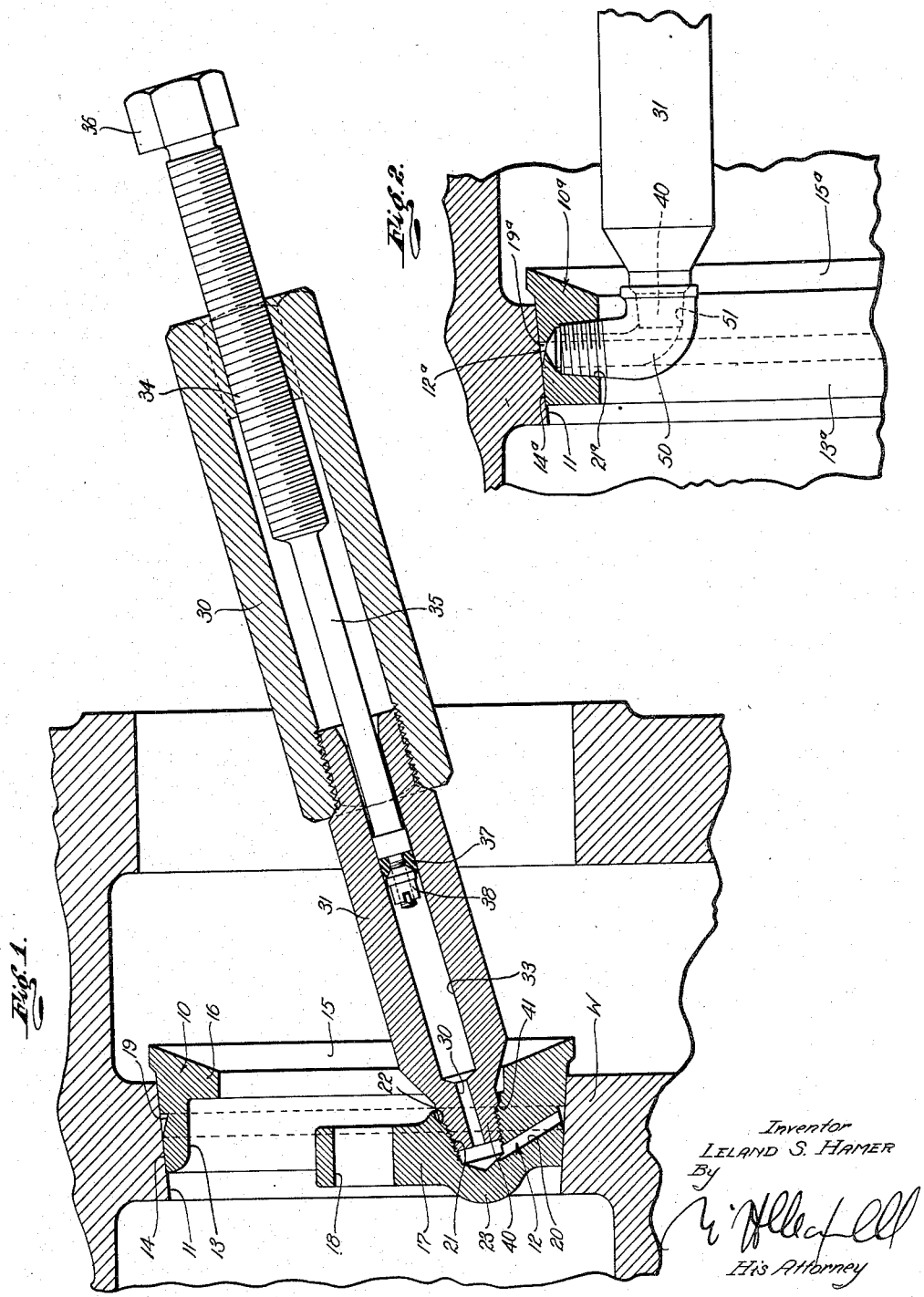
Inventor
LELAND S. HAMER
By
His Attorney Patented May 25, 1937

2,081,431

UNITED STATES PATENT OFFICE 2,081,431

VALVE SEAT

Leland S. Hamer, Long Beach, Calif.

Application March 10, 1934, Serial No. 715,029

2 Claims. (Cl. 251—167)

This invention relates to valve seats for use in pumps and the like and it is a general object of the invention to provide a simple practical valve seat that may be easily and quickly removed from its opening in the wall of a valve chest.

The valve seats of pumps, and like mechanisms, are often provided with tapered peripheries or exteriors to fit correspondingly shaped openings in the walls of the valve chests. These valve seats usually accurately fit the openings and the valves when closing hammer or drive the seats into the openings so that great difficulty is often encountered in removing the seats for grinding or replacement. In many instances the valve seats become so tightly set in the openings that they must be broken or destroyed in order to remove them.

Another object of this invention is to provide a valve seat that may be readily removed from its opening in the wall of a valve chest by the method and apparatus fully described and claimed in my co-pending application entitled Method and apparatus for disconnecting parts, filed March 10, 1934, Serial No. 715,030.

Another object of the invention is to provide a valve seat that is normally tightly and dependably held in its opening in the wall of the valve chest and may be easily removed from the opening without striking it, jarring it, or otherwise subjecting it to breaking forces.

Another object of the invention is to provide a valve seat that is provided with means whereby it may be loosened or removed from the opening in the wall of a valve chest by fluid pressure acting between the seat and the wall of the opening.

Another object of the invention is to provide a practical, effective valve seat having means for conducting fluid pressure from a fluid pressure source or developing apparatus to a space between its periphery and the wall of the opening in which it is arranged, for the purpose of freeing or removing it from the opening.

A further object of the invention is to provide a valve seat of the character mentioned that is simple and inexpensive of manufacture.

Other objects and features of my invention will be better and more fully understood from the following detailed description of typical forms and applications of the invention, throughout which description reference may be had to the accompanying drawing, in which:

Fig. 1 is a longitudinal detailed sectional view of one form of valve seat of the present invention in position in an opening in a wall of a valve chest showing a fluid pressure developing apparatus in operative connection with the valve seat, and Fig. 2 is a fragmentary longitudinal detailed sectional view of another form of valve seat illustrating the fluid pressure developing means in connection therewith.

The present invention may be embodied in valve seats for use in various classes of mechanisms and in valve seats having various specific forms of sealing faces, etc. Throughout the following detailed disclosure I will describe the invention embodied in valve seats of the general type employed in slush pumps for handling mud-laden fluid at comparatively high pressures. It is to be understood that the invention is not to be construed as limited or restricted to the specific forms or applications about to be described but is to be taken as including any features or modifications that may fall within the scope of the claims.

The valve seat of the invention illustrated in Fig. 1 of the drawing includes, generally, a body 10 for arrangement in an opening 11 in the wall W of a valve chest and means 12 in the body 10 for receiving fluid pressure for removing the body from the opening 11.

The body 10 of the valve seat is annular in its general configuration, having a central opening 13 for passing the fluid handled in the pump. In accordance with the usual practice the opening 11 has inwardly tapered walls, and the exterior or periphery 14 of the valve seat body 10 is tapered and is finished to accurately and tightly fit the opening 11. The body 10 projects outwardly from the wall W and its projecting outer end is provided with a suitable sealing face 15 for engagement by the valve. The present invention may be embodied in valve seats having sealing faces of various characters and in valve seats for use in combination with various types of valves. In the particular case illustrated in the drawing the sealing face 15 of the valve seat body 10 is inclined or tapered inwardly and occupies the entire outer end of the body and the end of an inwardly projecting lip 16 on the body. In the form of the invention being described the body 10 has a web 17 projecting into or through its opening 13. The web 17 is integral with the body 10 and has an opening 18. The opening 18 is cencentric with the annular body 10 and is provided to slidably receive a guide stem of the valve.

The means 12 is provided to supply or conduct fluid pressure to a confined space between the body 10 of the seat and the wall of the opening 11 for effecting the removal of the valve seat from the opening. In accordance with the invention the confined space between the seat body 10 and the wall of the opening 11 may be in the form of a groove 19 in the periphery of the body 10. The groove 19 is spaced between the ends of the body 10 and is preferably annular to extend completely around the body. The confined fluid pressure receiving space or groove 19 may be of any suitable or desired shape. In the particular case illustrated the groove 19 is substantially triangular in cross sectional configuration, having an inclined inner wall and a substantially normal end wall.

The fluid pressure receiving or handling means 12 includes a port or opening 20 in the valve seat body 10 for conducting fluid pressure to the groove 19. The opening 20 communicates with the groove and extends inwardly through the wall of the body 10 into the web 17. In accordance with the invention means is provided for connecting a fluid pressure supply or developing means with the body 10 to deliver fluid pressure to the opening 20. This means may comprise a socket 21 in the outer side of the web 17. The inner end of the socket 21 communicates with the opening 20 and the socket is screw-threaded. An inclined annular shoulder 22 is provided in the outer end or mouth of the socket 21. If desired or found necessary the web 17 may be thickened or reinforced adjacent the socket 21 as illustrated at 23. Under normal operating conditions of the pump the opening 20 may be filled with grease or the like and closed by a plug threaded into the socket 21. When it is desired to remove the valve seat body 10 from the opening 11 fluid pressure is supplied to the confined space or groove 19 through the socket and opening 20 which pressure acts to release and disconnect the seat from the wall of the opening 11.

In Fig. 1 of the drawing I have illustrated a form of fluid pressure developing or supplying means fully described and claimed in my co-pending application referred to above. This device or apparatus includes a tubular body member 30 and a cylinder 31 screw-threaded into an end of the member 30. A reduced opening 32 is provided in the end portion of the cylinder 31 to conduct fluid from the principal opening 33 of the cylinder. A screw 34 is threaded into the body member 30 and carries a plunger 35 for operation in the cylinder opening 33. The projecting end of the screw 34 is provided with a polygonal head 36. The active end of the plunger 35 has a cup leather or plunger cup 37 for slidably sealing with the wall of the cylinder opening 33. A removably keyed nut 38 retains the plunger cup 37 in position. The outer end of the cylinder opening 33 and the passage 32 may be supplied or filled with grease or other suitable fluid. A threaded pin or reduced portion 40 is provided on the end of the cylinder 31. The upper end of the threaded pin 40 is provided with a bevelled shoulder 41 for cooperating with the shoulder 22 and makes an effective seal between the cylinder 31 and the valve seat body 10.

When the valve seat 10 is to be removed from the opening 11 the plug mentioned above is first removed from the socket 21 and the reduced portion or pin 40 of the cylinder 31 is threaded into the socket. The screw 34 may then be threaded inwardly to operate the plunger 35 into the cylinder opening 33. This puts the grease or fluid in the opening 20 and groove 19 under pressure. When sufficient pressure has been created in the groove 19 it suddenly frees or releases the seat body 10 from the wall of the opening 11.

Fluid pressure in the confined space or annular groove 19 acts outwardly against the wall of the opening 11 and inwardly against the body 10 and when the pressure becomes sufficiently great it suddenly springs the periphery of the seat body 10 free of the wall of the opening 11, thus releasing or disengaging the seat body 10 from the opening 11. The valve seat illustrated in Fig. 1 of the drawing does not involve any parts that materially interfere with the flow of fluid through the seat and is not weakened to any appreciable extent by the provision of the opening 20 and the groove 19. The valve seat may be quickly removed from the opening 11 in the manner described above without striking it.

The form of the present invention illustrated in Fig. 2 of the drawing includes an annular body 10$^a$ of substantially the same configuration as the body 10 described above. The exterior or periphery 14$^a$ of the body 10$^a$ is longitudinally tapered to tightly and evenly cooperate with the wall of the opening 11 in the valve chest wall. The body 10$^a$ may or may not have a valve guiding web. A concaved or inwardly dished sealing face 15$^a$ is provided on the projecting outer end of the body 10$^a$.

The means 12$^a$ for supplying or conducting fluid pressure for the purpose of removing the seat body 10$^a$ from the opening 11 includes a groove 19$^a$ in the periphery of the body. The groove 19$^a$ is spaced between the ends of the body and is preferably annular to surround the body. The particular groove 19$^a$ shown in the drawing is of the same configuration as the groove 19. A socket 21$^a$ is provided in the wall of the body opening 13$^a$ and extends radially outwardly to communicate with the groove 19$^a$. The socket 21$^a$ is threaded for the reception of a threaded part or fitting. While I have shown the socket 21$^a$ having a longitudinal axis substantially normal to the longitudinal axis of the seat body 10$^a$ it will be apparent that the socket may have its longitudinal axis pitched or inclined inwardly and toward the groove 19$^a$. The confined space or groove 19$^a$ may be filled or supplied with grease and normally closed by a plug threaded into the socket 21$^a$. This prevents the accumulation of solid material in the groove 19$^a$. The socket 21$^a$ may receive a threaded part on a fluid pressure developing or supplying apparatus or may receive a suitable adapter or fitting for facilitating the connection of such an apparatus with the body of the seat. In the particular arrangement illustrated in the drawing a fitting 50 in the form of an elbow has one end threaded into the socket 21$^a$. The mouth or socket 51 of the elbow 50 faces outwardly to receive the reduced portion or pin 40 on the cylinder 31. It is to be understood that the fitting 50 may receive the threaded parts of other fluid pressure supplying or developing means.

To remove the valve seat body 10$^a$ from the opening 11 the pin 40 of the cylinder 31 is threaded into the elbow 50 and the screw 34 is threaded inwardly as described above. This puts the fluid in the groove 19$^a$ under pressure and when the pressure in the groove 19$^a$ reaches a certain value the valve seat body is suddenly released from the wall of the opening 11. The fluid under high pressure in the groove 19$^a$ is effective in disconnecting or releasing the valve seat from the wall of the opening 11 without in any way harming or endangering the valve seat. The fitting 50 may be quickly threaded into the socket 21$^a$ after the removal of the plug from the socket to facilitate the connection of the fluid pressure supplying apparatus with the body 10ᵃ. The provision of the socket 21ᵃ and the groove 19ᵃ does not necessitate enlarged or projecting parts on the valve seat body and does not complicate the construction or make it expensive. The plug in the opening 21, if used, may be substantially flush with the wall of the body opening 13ᵃ so that it does not form an obstruction in the opening. The valve seats of the present invention are simple in construction and adapted to be easily and quickly removed from their openings in the valve chests of pumps and the like.

Having described only typical preferred forms and applications of my invention, I do not wish to be limited or restricted to the specific forms and applications herein set forth, but wish to reserve to myself any modifications or variations that may appear to those skilled in the art or fall within the scope of the following claims.

Having described my invention, I claim:

1. A valve seat for arrangement in a tapered opening in a wall, including an annular body having a tapered outer periphery adapted to bear in the opening whereby it is fixed therein, and an inwardly extending valve guiding web on the body, and means for releasing the body from the opening comprising walls on the body providing a groove in its outer periphery adapted to form a confined space between the body and the wall of the opening, and a port communicating with the groove and extending into the web and to the exterior thereof.

2. A valve seat for arrangement in a tapered opening in a wall, including an annular body having a tapered outer periphery adapted to bear in the opening whereby it is fixed therein, and an inwardly extending valve guiding web on the body, the body having a groove in its outer periphery adapted to form a confined space between the body and the wall of the opening, a threaded socket in the web, and a port extending between the socket and groove for conducting fluid pressure to the space to release the body from the wall.

LELAND S. HAMER.